No. 648,645. Patented May 1, 1900.
H. WETZEL & F. J. SHAW.
FOLDING CRATE.
(Application filed Dec. 26, 1899.)
(No Model.)

Witnesses,

Inventors,
Henry Wetzel
Francis J. Shaw
By Dewey Strong & Co.
Attys

UNITED STATES PATENT OFFICE.

HENRY WETZEL, OF ALAMEDA, AND FRANCIS JOSEPH SHAW, OF OAKLAND, CALIFORNIA.

FOLDING CRATE.

SPECIFICATION forming part of Letters Patent No. 648,645, dated May 1, 1900.

Application filed December 26, 1899. Serial No. 741,593. (No model.)

*To all whom it may concern:*

Be it known that we, HENRY WETZEL, residing at Alameda, and FRANCIS JOSEPH SHAW, residing in the city of Oakland, county of Alameda, State of California, citizens of the United States, have invented an Improvement in Folding Crates; and we hereby declare the following to be a full, clear, and exact description of the same.

Our invention relates to a box, crate, or like structure and means by which it may be readily folded to occupy a small compass for transportation or storage and extended into shape as a container and locked in its extended position.

It consists in details of construction and mechanism which will be more fully explained by reference to the accompanying drawings, in which—

Figure 1:
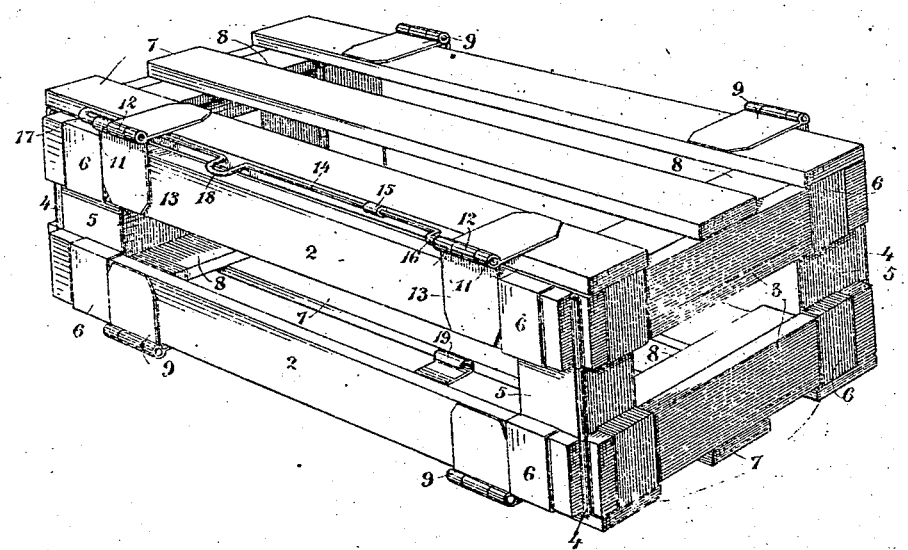
Figure 3:
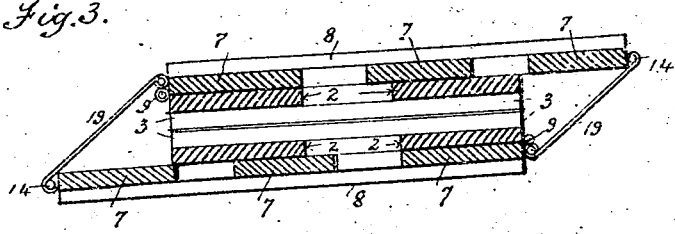
Figure 2:
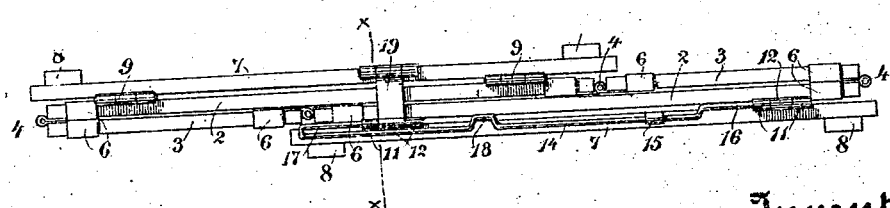

Figure 1 shows the crate opened out. Fig. 2 shows it folded together. Fig. 3 is an enlarged cross-sectional view on the line $x\,x$ of Fig. 2.

The box or crate may be made with close or open sides and of any suitable or desired material. In the present case we have illustrated the invention as applied to a crate made of strips of material connected together with open spaces between to form what is known as a "crate."

The sides 2 and the ends 3 are made of any desired length and depth and are connected to vertically-disposed hinges 4. The plates 5 of which these hinges are composed are stamped out of sheet metal, with extensions at the ends, which are afterward bent over, so as to form sockets 6, into which the sides 2 and 3 are forced, and they may be afterward riveted through, so as to be permanently secured to the hinge-plates. Each corner is formed of plates of this description hinged together, and when it is desired to collapse the box the sides and ends are folded flat together, these hinges turning to allow of this operation.

The doors or covers 7 are made of strips similar to the sides and ends and are connected together by transverse interior strips 8, which project from the inside face of the strips 7, so that these transverse strips form stops or abutments against which the ends 3 of the box close and which thus serve to maintain the box in its rectangular form and prevent the hinges 4 from yielding, so that the box would get out of shape. The covers have strap-hinges 9, by which they are secured to the opposite sides of the crate, as here shown. It will be understood that one or two of these covers may be used. In the present case we have shown one upon each side. The ends of the straps which extend across the tops or covers project sufficiently beyond the sides and are turned over to form loops 11, which when the covers are closed coincide with corresponding loops 12, formed on the straps 13, which are fixed to the sides of the box. Thus when the cover is closed and the loops 11 and 12 are in line they are locked and secured by means of slidable bolts. The bolt which we have here shown for the purpose is peculiarly made. It consists of a stout rod or wire, the shank 14 of which is slidable in a guide 15, and the rod is bent first outward and then again parallel with the main portion, as shown at 16, and this part is slidable through one set of the locking-loops 11 12. The other end of the rod is bent upon itself, so that the part 17 is in line with the part 16 and is thus slidable through the locking-loops 11 12 of the fastening at that end of the cover. Near the strap at this end and just inside of it the rod is bent upon itself, forming a loop 18, which acts as a handle to move the rod and may act in conjunction with the outwardly-bent part at the opposite end to limit the distance to which the rod can be slid backward, so that the turned-over end 17 will remain engaged with the outermost loop of the strap through which it is slidable. Thus when the rod is drawn back the cover can be opened, and when the cover has been closed to bring the loops of the top strap in line with those of the side strap the rod can be pushed through the loops, thus locking the cover in place.

As before stated, the cover may be applied upon each side of the box, if desired—one opening in one direction and the other from the opposite side—and these covers can be folded back when the box is to be collapsed, so as to lie against the outer faces of the sides 2. In this position they can be secured by latches 19, which are hinged to the edges of the covers and are adapted to engage with the projecting edges of the straps of the cover on the opposite side, and this will secure the box or plate in its collapsed form and prevent its being opened or separated until it is desired to do so.

Having thus described our invention, what we claim as new, and desire to secure by Letters Patent, is—

1. A folding crate consisting of sides and ends, and vertical connecting-hinges therefor, having laterally-projecting sockets adapted to receive and support the adjacent portions of the said sides and ends.

2. In a folding box or crate, sides and ends having vertical intermediate hinges at each of the angles, and sockets formed integral with said hinges and into which the adjacent parts of the sides and ends are received and secured, a top and bottom having transverse interior bars acting when closed as stops against which the box ends abut, hinges by which the top and bottom are turnably connected with the sides, and fastenings by which they are locked to the sides opposite the hinges when closed.

3. A folding box or crate consisting of sides and ends made of spaced strips, vertical plates at the inner angles of the box or crate, said plates hinged together along their meeting edges and having laterally-extending sockets adapted to receive and support the end portions of the strips forming said sides and ends, a hinged top and bottom, and hinge-plates extending across and projecting beyond the adjacent edges of the top and bottom and sides, said hinged plates having interlocking loops adapted to be alined, and guided slide-bolts adapted to engage and interlock the loops.

4. A folding box or crate consisting of sides and ends made of spaced strips, vertical plates at the inner angles of the box or crate and hinged together along their meeting edges, and provided with laterally-extending sockets adapted to receive and support the end portions of said strips, a top and a bottom hinged at diagonally-opposite angles of the sides, hinge-plates extending across and projecting beyond the opposite edges of said top and bottom, similar hinge-plates fixed to the sides, the meeting portions of the hinged plates being formed with interlocking loops, and rods guided and slidable upon the edges of the top and bottom and having opposite ends bent and adapted to engage said loops and thereby lock the hinge-plates together.

5. A folding box or crate consisting of sides and ends vertically hinged at the angles, the top and bottom having transverse interior bars acting as stops against the ends when closed, hinges by which said top and bottom are united with the diagonally-opposite angles of the sides, the top plates of said hinges extending beyond the opposite edges of the covers and having loops formed therein, plates fixed to the sides having corresponding loops which interlock therewith, guided slidable rods upon the edges of the covers having one end bent to slide through the interlocking loops near one end of the box and the other bent upon itself and slidable through the other loops, and a bend in the rod forming a stop to limit the movement of the rod.

6. A folding box or crate consisting of sides and ends having vertical hinges at the angles whereby the sides and ends may be collapsed to lie flat transversely, said hinges including plates formed integral with outwardly-extending sockets adapted to receive and support the adjacent extremities of the sides and ends, a top and bottom hinged to diagonally-opposite angles of the sides, with means for locking them when closed, said top and bottom being foldable outwardly to lie against the interior surface of the sides when the box has been collapsed, and hook-plates hinged to the covers and adapted to lock and engage with the opposite sides when the parts have been folded.

In witness whereof we have hereunto set our hands.

HENRY WETZEL.
FRANCIS JOSEPH SHAW.

Witnesses:
F. A. BARKER,
ISHAM CASE.